United States Patent [19]

Gouyou-Beauchamps

[11] 4,257,397
[45] Mar. 24, 1981

[54] SOLAR WATER HEATER

[75] Inventor: Jacques Gouyou-Beauchamps, Ville d'Avray, France

[73] Assignee: Saunier Duval, Rueil Malmaison, France

[21] Appl. No.: 12,794

[22] Filed: Feb. 16, 1979

[30] Foreign Application Priority Data

Feb. 20, 1978 [FR] France ............................... 78 04674

[51] Int. Cl.³ ................................................ F24J 3/02
[52] U.S. Cl. ..................................... 126/427; 126/437
[58] Field of Search ............... 126/421, 422, 423, 426, 126/435, 437, 450, 400; 165/18; 237/8 R, 59, 66

[56]  References Cited
U.S. PATENT DOCUMENTS

| 3,299,881 | 1/1967 | Koch ...................................... 126/427 |
| 3,991,742 | 11/1976 | Gerber ................................ 126/416 |
| 4,027,821 | 6/1977 | Hayes .................................... 126/427 |
| 4,050,626 | 9/1977 | Awalt, Jr. ............................. 126/427 |
| 4,061,132 | 12/1977 | Ashton ................................ 126/427 |
| 4,099,338 | 7/1978 | Mullin .................................. 126/427 |
| 4,137,900 | 2/1979 | Brautigam ........................... 126/427 |

*Primary Examiner*—James C. Yeung
*Attorney, Agent, or Firm*—Kenway & Jenney

[57]  ABSTRACT

An apparatus for heating water with solar radiation incorporates an auxiliary heating unit, external to the hot water reservoir and bypassing the solar heating element, for providing auxiliary water heating whenever the temperature in a selected portion of the reservoir decreases below a predetermined level. A common return conduit in combination with a single supply pump and a selector valve enable the auxiliary heating "by-pass" circuit to be simply and quickly added to already existing installations.

10 Claims, 1 Drawing Figure

SOLAR WATER HEATER

BACKGROUND OF THE INVENTION

This invention relates generally to systems for heating water by means of solar radiation and in particular to water heating systems utilizing auxiliary heaters and a system circulation pump.

Devices for heating water from the sun's rays are well known in the art. However, a problem which must be addressed in any such heating system is how to maintain a supply of hot water either when the sun isn't shining, e.g. during the night, or particularly during prolonged periods of cloudiness, or when the demand for hot water exceeds the solar heating system's ability to provide it.

The most common solution to this problem is to have a conventional heating source available as an auxiliary back-up in times of need. Typically, this auxiliary heating requirement employs a heating loop connected to a heat exchanger inside a hot water tank or reservoir and to a thermostatically controlled external heating source. Alternatively a thermostatically controlled electric immersion heater can be employed by inserting the heating elements directly into the tank. The thermostat typically senses the temperature of the water in the tank, and, if the temperature falls below a predetermined value, activates the auxiliary heater.

These systems perform satisfactorily, however, they require installation of a heat exchanger in the solar heating fluid flow circuit as well as the installation of, for example, an electric immersion heater. The associated reservoir is therefore different than a conventional tank and the cost of the reservoir is thus increased.

In a solar heater built in accordance with the present invention these drawbacks are avoided. It is thus an object of the invention to provide an auxiliary heating unit for a solar hot water heater which is completely external to the hot water reservoir and which will rapidly heat water and supply it into the reservoir when needed. Another object of the invention is a solar hot water heater having an auxiliary heater which can be adapted readily to an existing conventional hot water tank with at most minor modifications of a standard tank. Other objects of the invention are a simple, reliable solar hot water heating system requiring minimum installation cost and efficient operation.

SUMMARY OF THE INVENTION

The invention relates to an apparatus for heating water with solar radiation. The apparatus features a hot water reservoir, a solar heating element having a water input and a water output for heating water circulating therethrough, a fluid supply means for supplying the solar element with a water input, and a fluid return means connecting the solar element output to the water reservoir. The invention further features an auxiliary heating unit positioned externally to the reservoir and having a water input and a water output, an auxiliary supply means for fluidly connecting the reservoir with the auxiliary heating unit input, and an auxiliary return means for fluidly connecting the heating unit output with the fluid return means for returning auxiliary heating unit, heated water to the reservoir.

In a preferred embodiment of the invention, the fluid return means comprises a single pump having a pump input and a pump output for pumping water from the solar heating element or the auxiliary heating unit to the reservoir. Preferably, the fluid return means features a selector valve for alternately connecting the pump input to one of either the solar element or the auxiliary return means.

In specific embodiments of the invention, the fluid return means has a return conduit located approximately halfway up the vertical side of the reservoir and a fitting connected to the end of the return conduit for slowing down the velocity of incoming water. In addition, the auxiliary supply means may take water through a conduit located halfway up the vertical side of the reservoir.

The apparatus according to the invention further features a plurality of temperature sensitive members, one of the members being located approximately halfway up the vertical side of the reservoir, a second one of the members being located at the bottom of the reservoir, and a third one of the members being located near the outlet of the solar heating element. A control element connects the members for controlling the operation of the pump and the selector valve. The control element is responsive to the first temperature sensitive member for actuating the pump and causing the selector valve to connect the pump input to the auxiliary return means whenever the first thermostat detects the temperature less than a first predetermined temperature. This condition occurs irrespective of the temperatures sensed by the second and third temperature sensing members. When the temperature sensed by the first temperature sensitive element is above the predetermined temperature, the pump then operates only if the temperature sensed by the third temperature sensitive member exceeds that sensed by the second temperature sensitive member. In this second mode of operation the selector valve connects the pump input to the output solar element. The selector valve however only connects to the output of the solar element, in the preferred embodiment, when the temperature detected by the third member is greater than the temperature sensed by the second member.

DESCRIPTION OF THE DRAWINGS

Other objects, features, and advantages of the invention will appear from the following description of a preferred embodiment of the invention taken together with the single FIGURE which is a schematic diagram of the preferred embodiment of the invention.

DESCRIPTION OF A PREFERRED EMBODIMENT

Figure 1:
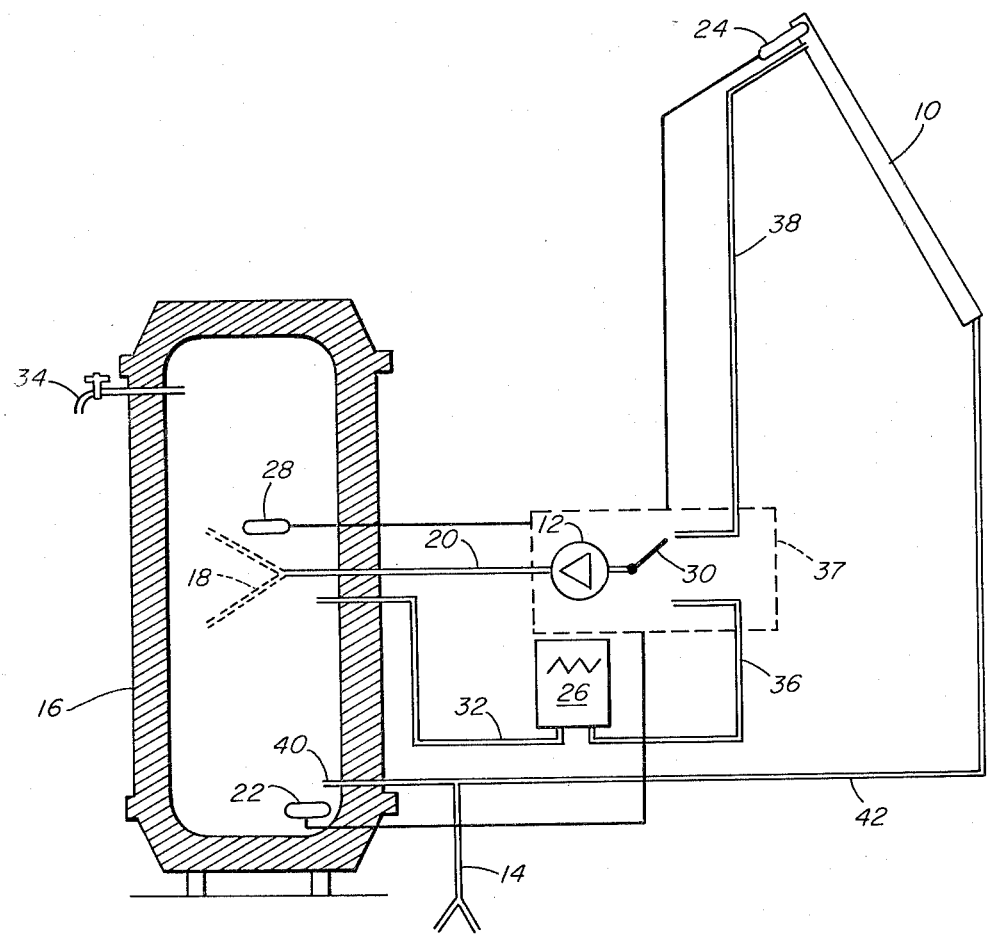

Referring to FIG. 1, a solar water heater in accordance with the present invention includes a solar heating element, solar panel 10, which collects the sun's rays and uses them to heat water which is flowing through the panel under the influence of a circulating pump 12. The water can be supplied either from an external cold water tap 14 or from a previously filled water holding tank or reservoir 16. The heated water then is pumped from the solar panel into the water tank to be stored or dispensed as needed. A fitting 18 located at the end of a supply line 20 into the tank slows down the velocity of the incoming stream of hot water, thereby facilitating the distribution of the water throughout the total volume of water already within the tank, as determined by their relative temperatures.

A temperature sensing member, thermostat 22, is located near the bottom of the tank and a second temperature sensing member, thermostat 24, is located at the outlet of the solar panel. If the water temperature sensed by the first thermostat 22 falls below a first predetermined value and the temperature sensed by the second thermostat 24 exceeds this same value, water will circulate from the solar panel to the tank until this selected temperature is detected by the first thermostat.

If, however, the temperature at the solar panel outlet is also below this predetermined temperature value, as might occur for example, during the absence of sunlight, the solar heating system would be unable to supply heated water to the tank. Then, as the total heat content of the water in the tank is reduced either by removal of hot water for use or by gradual heat loss through the walls of the tank, the water temperature in the upper portion of the tank also will fall below an acceptable level. An auxiliary heater 26 then operates to maintain the upper level water at an acceptable level.

A third temperature sensitive member, a thermostat 28, located essentially halfway up the tank, senses when this upper portion water temperature goes below an acceptable temperature level and activates the auxiliary heating unit. The thermostat 28 both energizes the pump 12 and activates a selector valve 30 which disconnects the pump from the solar heating panel output and connects it to the auxiliary heater output, which is essentially in parallel with the panel. In the illustrated embodiment, water is drawn from the tank, through a line 32, also located approximately halfway up the tank, is heated by the auxiliary unit, and is returned to the tank through the common tank supply line 20 emanating from the pump outlet or discharge. The illustrated auxiliary unit is capable of heating up the volume of water in the upper half of the tank within a few minutes. When the water temperature sensed by the third thermostat 28 reaches the acceptable level, the auxiliary heater and pump stop, and the switching valve can reconnect the pump to the solar panel, ready for another cycle of solar heating.

Even if adequate sunlight is available and the solar heater is operating properly, but excessive hot water usage reduces the water temperature in the upper portion of the tank to below the acceptable level, the auxiliary heater will take priority over the solar heater, so that the solar panel will be bypassed until the upper portion temperature has been raised sufficiently. Once an acceptable level has been reached, the selector valve will reconnect to the solar panel and allow the solar heating process to resume its normal operation. The water reservoir 16 thus serves as a storage tank for hot water which can be dispensed through an outlet 34.

Assuming that reservoir 16 is filled initially with cold water, typical operation of the solar water heater is as follows. Thermostat 28, detecting a water temperature lower than a predetermined acceptable value, switches selector valve 30 to a down position, connecting it to a line 36, and energizes pump 12. Water is drawn from reservoir 16 through line 32, is heated in auxiliary heater 26, and then is readmitted to reservoir 16 through line 36, selector valve 30, pump 12, line 20 and fitting 18. Fitting 18, as noted above, decreases the velocity of the incoming stream of hot water, so that the water can flow either upward or downward depending on its temperature relative to that of reservoir water at that point. Although fitting 18 facilitates this dispersion process, the water heater still will perform satisfactorily without it. Auxiliary heater 26 can be an electric, gas or other conventionally fueled type, and pump 12 and selector valve 30 can be part of a self-contained standard unit 37, well known as a standard heating apparatus. When the water temperature at thermostat 28 exceeds the acceptable value, heater 26 and pump 12 stop, and selector valve 30 returns to an "up" position, connected to a line 38 from the solar panel output. Alternatively, valve 30 can be controlled to return to the "up" position only if prescribed conditions exist, e.g. if the temperature sensed by thermostat 24 is greater than the temperature sensed by thermostat 22.

If the water temperature at thermostat 22 is still below a specific predetermined value, and the temperature sensed by thermostat 24 exceeds this same value, selector valve 30 remains in (or in an alternate embodiment, returns to) its "up" position, pump 12 energizes, and water circulates from reservoir 16 through end 40 to a line 42 and circulates through solar panel 10. Solar panel 10 converts the incoming solar radiation for heating the water circulating within it. The heated water exits panel 10 into line 38, then through selector valve 30, pump 12, line 20 and fitting 18 back into reservoir 16. This process continues until the water temperature sensed by thermostat 22 reaches the selected temperature level.

As hot water is dispensed through outlet 34, cold water enters from a cold water supply 14. This cold water eventually will lower the water temperature around thermostat 22 below the selected value, initiating another cycle of solar heating through solar panel 10. However, in periods wherein solar panel 10 is unable to heat the water, the water in reservoir 16 will continue to cool until thermostat 28 senses a sufficiently cold temperature to initiate again a cycle of auxiliary heating through heater 26. The selected temperatures at which thermostats 22 and 28 initiate operation of pump 12 need not be the same.

As various changes could be made in the above construction without departing from the scope of the invention, it should be understood that all matter contained in the above description or shown in the accompanying drawing shall be interpreted as illustrative and not in a limiting sense. For example, heater 26 could also be connected to the cold water supply or temperature sensing can occur at different positions within the reservoir. Thus additions, subtractions, deletions and other modifications of the invention will be obvious to those skilled in the art and are within the scope of the claims.

What is claimed is:

1. A hot water heating apparatus for heating and storing hot water using solar radiation, comprising:
    a hot water reservoir;
    a solar heating element having a water input and a water output for heating water circulating therethrough,
    fluid supply means for supplying said solar element with a water input;
    fluid return means connecting said solar element output to said water reservoir;
    an auxiliary heating unit, positioned external to said reservoir, said heating unit having a water input and a water output;
    auxiliary supply means for fluidly connecting said reservoir with said heating unit input;
    auxiliary return means for fluidly connecting said heating unit output with said fluid return means for returning heating unit heated water to said reservoir; and said fluid return means further including a single pump having a pump input and a pump output, for pumping water from said solar heating element and said auxiliary heating unit to said reservoir, and a selector valve for alternately connecting said pump input to said one of said solar element and said auxiliary return means.

2. The water heating apparatus as set forth in claim 1 wherein said fluid return means comprises a return conduit located approximately halfway up said reservoir.

3. The water heating apparatus as set forth in claim 2 further comprising a fitting connected to an end of said return conduit for slowing down the incoming water velocity.

4. The water heating apparatus as set forth in claim 1, wherein said auxiliary supply means comprises a conduit located approximately halfway up said reservoir.

5. The water heating apparatus as set forth in claim 1, wherein said pump and the selector valve are located within a self-contained assembly.

6. The water heating apparatus as set forth in claim 1 further comprising a plurality of temperature sensing members, and wherein a first one of the temperature members is located approximately halfway up the reservoir, a second one of said temperature members is located near the bottom of said reservoir, and a third one of said temperature members is located near the outlet of the solar heating element, and means for connecting said temperature members for controlling operation of said pump and said selector valve.

7. The water heating apparatus as set forth in claim 6 wherein said connecting and control means comprises means responsive to said first temperature member for actuating said pump and for causing said selector valve to connect said pump input to said auxiliary return means when said first member senses a temperature less than a first predetermined temperature.

8. The water heating apparatus as set forth in claim 6 wherein said connecting and control means comprises means responsive to said second and third temperature members for connecting said pump input to said auxiliary return means when the temperature sensed by said third member is less than the temperature sensed by said second member.

9. The water heating apparatus of claim 8 wherein said connecting and control means comprises means responsive to said second and third members for connecting said pump input to said solar element output when the temperature sensed by said third member is greater than the temperature sensed by said second member.

10. The water heating apparatus of claim 9 wherein said connecting and control means is further responsive to said first temperature member for activating said pump and for connecting said pump input to said auxiliary return means whenever the temperature sensed by said first member is less than a predetermined value no matter what temperatures are sensed by the second and third members.

* * * * *